Patented June 26, 1951

2,558,711

UNITED STATES PATENT OFFICE 2,558,711

PTEROYLGLUTAMIC ACID COMPOUNDS AND PROCESS OF PREPARING SAME

David I. Weisblat, Barney J. Magerlein, Arthur R. Hanze, and Stanley T. Rolfson, Kalamazoo, Mich., assignors to The Upjohn Company, Kalamazoo, Mich., a corporation of Michigan No Drawing. Application July 31, 1948, Serial No. 41,882

12 Claims. (Cl. 260—251.5)

This invention relates to compounds closely allied to, or identical with, compounds of the folic acid group, particularly to a method for preparing certain N'-(N-((2-amino-4-hydroxy-6-pteridyl)methyl)-p-aminobenzoate compounds.

Compounds which can be prepared by the method of the invention and herein defined as the "N'-(N-((2-amino-4-hydroxy-6-pteridyl)methyl)-p-aminobenzoate compounds" have the generic formula

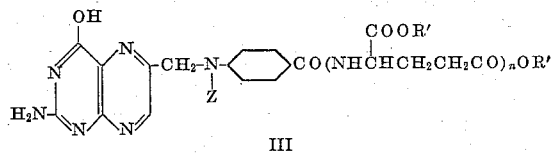

III wherein R' is from the group consisting of hydrogen and the alkyl radicals, n is from the group consisting of zero and the positive integers 1 to 7, inclusive, and Z is from the group consisting of hydrogen and the arylsulfonyl radicals.

In the naming of the compounds of the invention and of other compounds mentioned herein when both a glutamic acid residue and a p-aminobenzoic acid residue are included in the molecule the nitrogen atom of the glutamic acid residue is, for convenience herein referred to by the symbol "N'" and the nitrogen atom of the p-aminobenzoic acid residue is referred to by the symbol "N."

Certain of the compounds prepared by the method of the invention are identical with certain of the compounds referred to broadly in the art as "folic acids." Thus, N'-(N-((2-amino-4-hydroxy - 6 - pteridyl)methyl)-p-aminobenzoyl)-glutamic acid (pteroylglutamic acid) is generally recognized, when the glutamic acid residue has the same configuration as l(+)-glutamic acid, as being identical with the "L. casei factor" or vitamin B$_c$ from liver. The corresponding compound having three glutamic acid residues connected through the gamma-carboxyl groups (pteroyl-gamma - gutamyl - gamma - glutamyl - glutamic acid) is also recognized as being identical with another important factor of the folic acid group.

Compounds having the generic formula given wherein Z is an arylsulfonyl radical have not been described previously. These new compounds having the formula

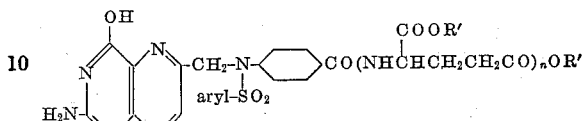

are, as hereinafter pointed out, valuable as intermediates in the preparation of the corresponding compounds of the folic acid group having a hydrogen atom in place of the arylsulfonyl radical.

As indicated by the formula given, compounds containing more than one glutamic acid or ester residue which can be made by the method of the invention, are those wherein only the gamma-carboxyl groups are involved in the peptide linkages, such as the residues derived from N'-(p-aminobenzoyl) - gamma - glutamylglutamic acid, N'-(p-aminobenzoyl)-gamma-glutamyl-gamma - glutamylglutamic acid, and the like. Preferred compounds made by the method of the invention are those wherein n represents the integer 1, i. e. those containing one glutamic acid or ester residue, and the invention will be described with particular reference thereto.

Compounds similar to, or identical with, those of the folic acid group made by the method of the invention, such as pteroyl-glutamic acid and pteroyl-gamma-glutamyl - gamma - glutamylglutamic acid, which are of greatest value as measured by their biological activity against Lactobacillus casei or Streptococcus fecalis R., are those wherein the glutamic acid residues possess the same configuration as l(+)-glutamic acid. However, the invention also contemplates the preparation of compounds having the dextro configuration as well as racemic mixtures.

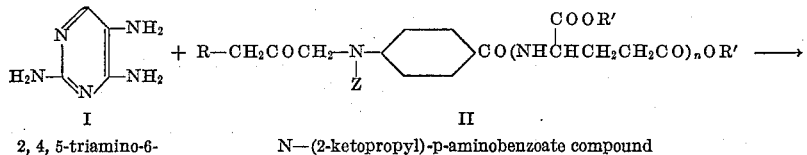

I
2, 4, 5-triamino-6-hydroxyprimidine

II
N—(2-ketopropyl)-p-aminobenzoate compound

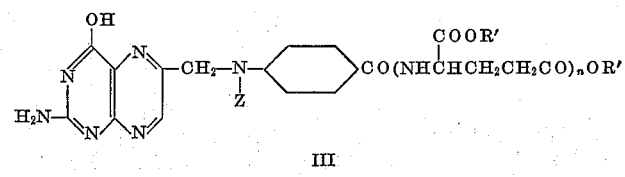

III

N'—(N—((2-amino-4-hydroxy-6-pteridyl)methyl)-p-aminobenzoate compound

As illustrated in the accompanying diagram an N'-(N-(2-amino-4-hydroxy-6-pteridyl)methyl)-p-aminobenzoate Compound III is prepared according to the method of the invention by reacting 2,4,5-triamino-6-hydroxypyrimidine (I) with an N-(2-ketopropyl)-p-aminobenzoate compound having the Formula II wherein R', $n$ and Z have the values given and R is from the group consisting of a halogen from the group consisting of chlorine, bromine and iodine and the hydroxy, alkoxy, aryloxy aralkoxy and acyloxy radicals. The reaction is usually carried out by mixing the 2,4,5-triamino-6-hydroxy-pyrimidine and the N-(2-ketopropyl)-p-aminobenzoate compound in a liquid medium, such as glacial acetic acid, and allowing the mixture to stand for several hours. The reaction can be carried out at ordinary room temperature, although the reaction mixture can be warmed somewhat or even cooled, if desired. Although the preferred reaction medium is glacial acetic acid, other suitable liquid media, such as propionic or valeric acids, alcohols, glycols, polyglycols, N-methylacetanilide and the like can be used, if desired. It is frequently found to be of advantage to include sodium acetate or a mixture of sodium acetate and potassium iodide in the reaction mixture. The function of these substances is not clearly understood but it appears that they favor the course and speed of the reaction in certain instances. It is probable that the sodium acetate affects the pH of the reaction mixture to some extent.

The 2,4,5-triamino-6-hydroxypyrimidine and the N-(2-ketopropyl)-p-aminobenzoate compound are generally used in approximately equimolecular proportions. Although the mechanism of the reaction is not completely understood, complete aromatization of the heterocyclic nitrogen ring system occurs during the course of the reaction with the formation of the pteridine nucleus.

Following the reaction period, the N'-(N-((2-amino-4-hydroxy-6-pteridyl)methyl)-p-aminobenzoate compound can be recovered from the reaction mixture in any convenient way. When the compound is to be used in a subsequent reaction, it is frequently satisfactory to use the acetic acid solution as it occurs at the end of the reaction period without an intermediate isolation step. Alternatively, the acetic acid can be distilled in vacuo to leave the N'-(N-((2-amino-4-hydroxy-6-pteridyl)methyl)-p-aminobenzoate compound as a solid or viscous liquid which is generally of sufficient purity for most uses.

Although the method is described in the case of starting and final products which are esters, with particular reference to the ethyl esters, it is understood that other alkyl esters, such as the methyl, n-propyl, iso-propyl, tert.-butyl, n-butyl, hexyl, dodecyl and others can be used, if desired.

Although the invention is directed particularly, in case of esters of the glutamic acid residues, to alkyl esters, the process of the invention can also be carried out and corresponding compounds prepared using other esters, such as the phenyl, tolyl, xylyl, cyclohexyl, benzyl and many other aryl, aralkyl or cycloalkyl esters.

It should also be mentioned that an N'-(N-((2-amino-4-hydroxy-6-pteridyl)methyl-p-aminobenzoate compound containing ester groups can be converted readily to the corresponding carboxylic acid by hydrolysis with dilute aqueous sodium hydroxide or other suitable alkali. The method is, as noted previously, applicable to the preparation of N'-(N-((2-amino-4-hydroxy-6-pteridyl)methyl-p-aminobenzoate compounds which are either devoid of a glutamic acid or ester residue, or which contain up to as many as seven such residues connected through the gamma-carboxyl groups.

Compounds prepared by or used in the method of the invention wherein Z of the generic formulas given represents an arylsulfonyl radical are of particular value because of the protection afforded the aromatic amino group by the arylsulfonyl group. Thus, N-(2-ketopropyl)-p-aminobenzoate compounds having the amino group protected in this fashion appear to be converted more smoothly and in higher yield to the corresponding N'-(N-((2-amino-4-hydroxy-6-pteridyl)methyl)-p-aminobenzoate compounds than do N-(2-ketopropyl)-p-aminobenzoate compounds wherein the aromatic amino group is not protected. Following the reaction, the arylsulfonyl radical can be split from the reaction product by treatment with hydrogen bromide and a hydrogen halide acceptor, such as phenol, in an aliphatic acid medium by the method described and claimed in a concurrently filed copending application, Serial No. 41,883 to form a compound having the Formula III wherein Z is hydrogen.

Although the reaction can be carried out using compounds wherein Z of the generic Formula II represents substantially any arylsulfonyl radical, such as the o-toluenesulfonyl, benzenesulfonyl or naphthalenesulfonyl radicals, the invention will be described with particular reference to the use of compounds containing the p-toluenesulfonyl radical. The use of compounds containing the p-toluenesulfonyl radical is of particular advantage because of the economy and ready availability of p-toluenesulfonyl chloride entering into their preparation and because the N'-(N-((2-amino-4-hydroxy-6-pteridyl)methyl)-p-aminobenzoate compounds containing a p-toluenesulfonyl radical can generally be isolated easily from the reaction mixture in solid form. Furthermore, it appears that in many instances a higher yield of an amine is obtained by splitting a p-toluenesulfonyl derivative of the amine with hydrogen bromide than is obtained when splitting certain other arylsulfonyl derivatives of the same amine. It should be mentioned, furthermore, that the method involved in the present invention can be carried out with satisfaction using N-(2-ketopropyl)-p-aminobenzoate compounds wherein the arylsulfonyl group is replaced by an alkylsulfonyl, aralkylsulfonyl or cycloalkylsulfonyl group, such as the methanesulfonyl, alpha-toluenesulfonyl or cyclohexylsulfonyl radicals, respectively. Furthermore, compounds containing an arylsulfonyl radical having substituents on the aryl nucleus, such as chlorine, bromine, or a nitro group, can also be used provided only that the substituent is non-reactive under the reaction conditions.

One convenient way of preparing an N-(2-ketopropyl)-p-aminobenzoate Compound II containing from 1 to 7 glutamic acid or ester residues in the molecule for use as starting material in the method of the invention consists in first reacting a glutamic acid compound having the Formula IV $$\text{H(NH}\overset{\text{COOR'}}{\overset{|}{\text{C}}}\text{HCH}_2\text{CH}_2\text{CO)}_n\text{OR'}$$

IV
Glutamic acid compound wherein R' is from the group consisting of hydrogen and the alkyl radicals and n is an integer from the group consisting of the integers 1 to 7, inclusive, with a p-nitrobenzoyl halide, as disclosed in a concurrently filed co-pending application, Serial No. 41,888, to form an N'-(p-nitrobenzoyl)- glutamic acid compound having the Formula V

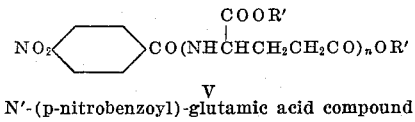

V
N'-(p-nitrobenzoyl)-glutamic acid compound

The latter compound is then reduced catalytically with hydrogen to form an N'-(p-aminobenzoyl)- glutamic acid compound having the Formula VI

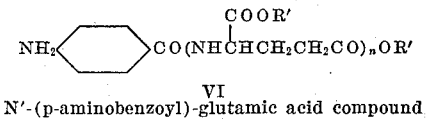

VI
N'-(p-aminobenzoyl)-glutamic acid compound

The latter compound, or p-aminobenzoic acid or its alkyl ester in case an intermediate devoid of a glutamic acid or ester residue is desired, can be reacted, to protect the aromatic amino group, with an arylsulfonyl halide in the presence of a hydrogen halide acceptor, such as pyridine in the case of esters or a dilute alkali in the case of acids, to form an N'-(arylsulfonyl-p-aminobenzoyl)-glutamic acid compound having the Formula VII

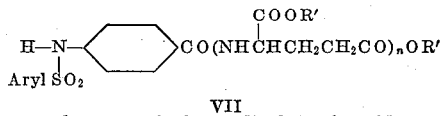

VII
N'-(arylsulfonyl-p-aminobenzoyl)-glutamic acid compound wherein R' has the value given and n is from the group consisting of zero and the positive integers 1 to 7, inclusive. The N'-(p-aminobenzoyl)-glutamic acid Compounds VI and the N'-(arylsulfonyl - p - aminobenzoyl) - glutamic acid Compounds VII are hereinafter referred to as "p-aminobenzoate compounds" and have the generic Formula VIII

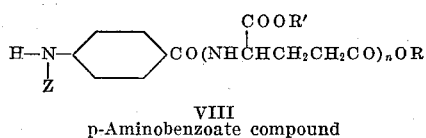

VIII
p-Aminobenzoate compound wherein R' is from the group consisting of hydrogen and the alkyl radicals, n is from the group consisting of zero and the positive integers 1 to 7, inclusive, and Z is from the group consisting of hydrogen and the arylsulfonyl radicals.

The p-aminobenzoate Compounds VIII can then be condensed with an epihalohydrin, i. e. with epichlorohydrin, epibromohydrin or epiiodohydrin as described and claimed in a concurrently filed co-pending application, Serial No. 41,884, to form an N-(3-halo-2-hydroxypropyl)-p-aminobenzoate compound having the Formula IX

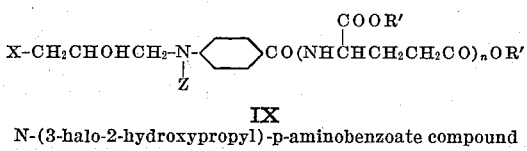

IX
N-(3-halo-2-hydroxypropyl)-p-aminobenzoate compound wherein X represents chlorine, bromine or iodine, and which can in turn be reacted with an alkali to eliminate hydrogen halide from the molecule and form an N-(2,3-epoxypropyl)-p-aminobenzoate compound having the Formula X

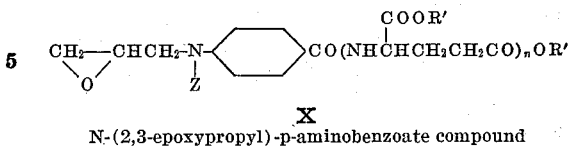

X
N-(2,3-epoxypropyl)-p-aminobenzoate compound

The later compound can then be reacted with water, an alkanol, an aralkanol, a phenol or a carboxylic acid to form an N-(3-oxy-2-hydroxypropyl)-p-aminobenzoate compound having the Formula XI

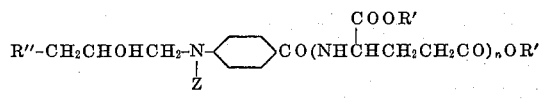

XI
N-(3-oxy-2-hydroxypropyl)-p-aminobenzoate compound wherein R'' is from the group consisting of the hydroxyl, alkoxy, aryloxy, aralkoxy and acyloxy radicals. The N - 3-halo-2-hydroxypropyl) - p - aminobenzoate Compounds IX and the N-(3-oxy-2-hydroxypropyl) - p - aminobenzoate Compounds XI can be oxidized smoothly with chromic anhydride as described and claimed in a concurrently filed co-pending application, Serial No. 41,889, to the N-(2-ketopropyl)-p-aminobenzoate Compounds II utilized as starting materials in the process of the present invention.

It should be mentioned, also, that the N-(3-hydroxy-2-ketopropyl) - p - aminobenzoate compounds having the Formula XII

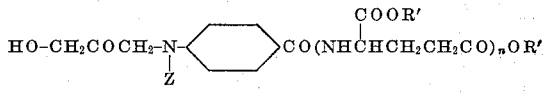

XII
N-(3-hydroxy-2-ketopropyl)-p-aminobenzoate compound can be prepared, as fully disclosed in the co-pending application, Serial No. 41,884, referred to, either by hydrolyzing an N-(3-halo-2-ketopropyl)-p-aminobenzoate compound having the Formula XIII

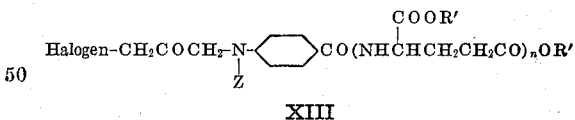

XIII
N-(3-halo-2-ketopropyl)-p-aminobenzoate compound wherein the halogen is chlorine, bromine or iodine, with an alkali, or by treating an N-(3-acyloxy-2-ketopropyl) - p - aminobenzoate compound having the Formula XIV

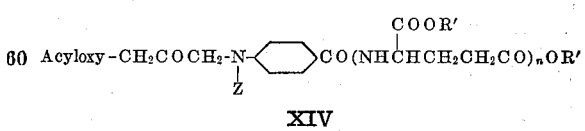

XIV
N-(3-acyloxy-2-ketopropyl)-p-aminobenzoate compound with an alkanol to effect ester interchange therewith. It is frequently advisable to convert the halogen and particularly the acyloxy compounds to the hydroxy compounds in this manner prior to reaction with 2,4,5-triamino-6-hydroxy-pyrimidine as better yields of the pteridyl compound are often thus obtained.

Certain advantages of the invention are apparent from the following examples which are given by way of illustration only and are not to be construed as limiting. Bio-assays referred to in the examples were made by the method of Teply and Elvehjem (J. Biol. Chem., 157, 303 (1945)).

*Example 1.—Diethyl N'-(p-nitrobenzoyl)-l-glutamate*

One hundred eleven grams of p-nitrobenzoyl chloride was added at about 0° C. over a period of about one hour to a solution of 95.8 grams of crude diethyl l(+)-glutamate hydrochloride and 80 milliliters of pyridine in 200 milliliters of benzene. The mixture was stirred for five hours, extracted first with dilute hydrochloric acid and then with aqueous sodium bicarbonate and the benzene removed under reduced pressure. The residue consisted of 110 grams of a pasty, neutral fraction consisting largely of diethyl N'-(p-nitrobenzoyl)-l-glutamate. After recrystallization from dilute ethanol, the ester melted at 93° to 95° C. It had a specific rotation of $(a)_D^{25} = -13°$ in 95 per cent ethanol. The sodium bicarbonate extract upon acidification yielded 42 grams of p-nitrobenzoic acid.

*Example 2.—Diethyl N'-(p-aminobenzoyl)-l-glutamate*

Crude diethyl N'-(p-nitrobenzoyl)-l-glutamate prepared as in Example 1 was dissolved in ethanol and reduced with hydrogen under a pressure of about 40 pounds per square inch using platinum oxide as a catalyst. The mixture was then filtered to recover platinum and the ethanol evaporated under reduced pressure. There was thus obtained at 52 per cent yield of diethyl N'-(p-aminobenzoyl)-l-glutamate melting at 135° to 138° C. Upon recrystallization from dilute ethanol, the ester melted at 140° to 141° C. and had a specific rotation of $(a)_D^{25} = -9.5$ in 95 per cent ethanol.

Anal. Calcd. for $C_{16}H_{22}O_5N_2$: C, 59.6; H, 6.9; N, 8.7. Found: C, 59.6; H, 6.8; N, 9.0.

*Example 3.—Diethyl N'-(p-toluenesulfonyl-p-aminobenzoyl)-l-glutamate*

Thirty and nine-tenths grams of p-toluenesulfonyl-p-aminobenzoyl chloride and 23.9 grams of diethyl l(+)-glutamate hydrochloride were dissolved in 300 milliliters of ethylene dichloride and the solution cooled to between 0° and 10° C. The cold solution was stirred vigorously and 22.3 grams of triethylamine in 72 milliliters of ethylene dichloride was added slowly over a period of about 20 minutes. The temperature of the mixture was held between 10° and 20° C. during the addition of the triethylamine and the mixture then allowed to stand at room temperature for one hour. The mixture was then washed successively with water, dilute hydrochloric acid, saturated aqueous sodium bicarbonate and finally with water. The colorless solution thus obtained was dried with anhydrous sodium sulfate and naphtha was added until the solution became opalescent. The mixture was then cooled to cause crystallization and filtered. The crystals, after drying, consisted of 36 grams of diethyl-N'-(p-toluenesulfonyl-p-aminobenzoyl)-l-glutamate melting at 124° to 126° C.

*Example 4.—Diethyl N'-(p-toluenesulfonyl-p-aminobenzoyl)-l-glutamate*

A mixture of 407 grams of p-toluenesulfonyl-p-aminobenzoic acid and 3,450 milliliters of toluene was dried by distilling the mixture until 350 milliliters of distillate had been collected. A few drops of pyridine and 50 milliliters of thionyl chloride was then added to the dry toluene solution and the mixture stirred and refluxed for one-half hour. The solution was then cooled with agitation for two hours and the solid which precipitated was recovered by filtering and washing with toluene and then with mixed hexanes and drying. There was thus obtained 387 grams of p-toluenesulfonyl-p-aminobenzoyl chloride melting at 141° to 142° C.

A mixture of 48 grams of diethyl l(+)-glutamate hydrochloride, 68 grams of p-toluenesulfonyl-p-aminobenzoyl chloride, 19 grams of magnesium oxide, 250 milliliters of ethylene dichloride and 100 milliliters of water was stirred with cooling for about 4 hours. The mixture was filtered and the organic layer was separated from the filtrate and washed successively with water, ice cold dilute hydrochloric acid, water and dilute aqueous sodium bicarbonate. The washed organic layer was then dried and diluted with mixed hexanes until slightly turbid and allowed to crystallize. Upon filtering the mixture, there was obtained 78 grams of diethyl N'-(p-toluenesulfonyl-p-aminobenzoyl)-l-glutamate melting at 125° to 126° C. and having a specific rotation of $$(a)_D^{25} = -13.2°$$

in a mixture of 5 per cent methanol and 95 per cent ethanol. The diester is hydrolyzed readily with dilute sodium hydroxide to form N'-(p-toluenesulfonyl-p-aminobenzoyl)-l-glutamic acid.

*Example 5.—Diethyl N'-(N-(3-chloro-2-hydroxypropyl)-p-toluenesulfonyl-p-aminobenzoyl)-glutamate*

A mixture of 2.85 grams of diethyl N'-(p-toluenesulfonyl-p-aminobenzoyl)-glutamate and 1.1 grams of epichlorohydrin was agitated at 135° C. Two drops of pyridine were added and agitation at 135° C. was continued for five minutes. The excess epichlorohydrin was volatilized under reduced pressure. The residue which consisted of diethyl N'-(N-(3-chloro-2-hydroxypropyl)-p-toluenesulfonyl-p-aminobenzoyl)-glutamate was used in subsequent experiments without further purification. Diethyl N'-(N-(3-bromo-2-hydroxypropyl)-p-toluenesulfonyl-p-aminobenzoyl)-glutamate is prepared in similar fashion using epibromohydrin instead of epichlorohydrin.

*Example 6.—Ethyl N-(3-chloro-2-hydroxypropyl)-p-toluenesulfonyl-p-aminobenzoate*

A mixture of 5 grams of ethyl p-toluenesulfonyl-p-aminobenzoate and 3.4 milliliters of epichlorohydrin was heated at 135° C. and two drops of pyridine added. A vigorous action ensued and after 5 minutes the mixture was cooled, dissolved in 50 milliliters of ethanol and treated 3 times with decolorizing carbon. The ethyl N-(3-chloro-2-hydroxypropyl)-p-toluenesulfonyl-p-aminobenzoate which remained upon volatilization of the ethanol and excess epichlorohydrin in vacuo was used in subsequent reactions without further purification.

*Example 7.—Diethyl N'-(N-(2,3-epoxypropyl)-p-toluenesulfonyl-p-aminobenzoyl)-glutamate*

A mixture consisting of about 1.3 grams of diethyl N'-(N-(3-chloro-2-hydroxypropyl)-p-toluenesulfonyl-p-aminobenzoyl)-glutamate, 20 milliliters of methyl ethyl ketone, 0.17 gram of sodium bicarbonate and 3 milliliters of water was refluxed for 40 minutes. The methyl ethyl ketone and water were then distilled in vacuo and the residue taken up in a mixture of ether and water containing a small proportion of alcohol. The ether layer was separated, washed with cold dilute sulphuric acid then with water and saturated sodium bicarbonate solution and finally twice with water and once with saturated sodium chloride solution. The washed solution was filtered through anhydrous sodium sulfate and the ether distilled in vacuo. The residue consisted of 0.98 gram of diethyl N'-(N-(2,3-epoxypropyl)-p-toluenesulfonyl-p-aminobenzoyl)-glutamate in the form of a light brown oil. This is a yield of 87.5 per cent of the theoretical amount.

The epoxypropyl compound obtained as just described and other epoxy compounds described in the examples were assayed for epoxy content by the following procedure: One gram of the epoxy compound was dissolved in five milliliters of absolute ethanol and 20 milliliters of a 0.1 to 0.15 normal standardized solution of hydrogen chloride in ether was added. After standing at room temperature for two hours, 30 to 40 milliliters of water was added to the mixture and the unreacted hydrogen chloride titrated with standardized alkali. The hydrogen chloride consumed was a measure of the amount of epoxy compound present. When analyzed in this manner, the crude epoxy compound was shown to contain 49.4 per cent of epoxy compound.

When the above procedure was carried out using dilute ethanol instead of methyl ethyl ketone, there was obtained a 75 per cent yield of product which upon assay for epoxy content proved to be 80 per cent pure diethyl N'-(N-(2,3-epoxypropyl)-p-toluenesulfonyl-p-aminobenzoyl)-glutamate.

When the procedure was carried out using anhydrous potassium carbonate and anhydrous methyl ethyl ketone there was obtained a 72 per cent yield of product which upon assay was found to contain 42.8 per cent of diethyl N'-(N-(2,3-epoxypropyl)-p-toluenesulfonyl-p-aminobenzoyl)-glutamate.

*Example 8.—Ethyl N-(2,3-epoxypropyl)-p-toluenesulfonyl-p-aminobenzoate*

In a manner similar to that described in Example 7 ethyl N-(3-chloro-2-hydroxypropyl)-p-toluenesulfonyl-p-aminobenzoate was treated with anhydrous potassium carbonate in anhydrous methyl ethyl ketone. The mixture was refluxed two hours. From the mixture there was isolated a product containing 33 per cent of ethyl N-(2,3-epoxypropyl)-p-toluenesulfonyl-p-aminobenzoate.

When the process was repeated using sodium bicarbonate and dilute ethanol instead of anhydrous potassium carbonate and anhydrous methyl ethyl ketone and the mixture refluxed for thirty minutes, the crude product obtained contained 46.4 per cent of ethyl N-(2,3-epoxypropyl)-p-toluenesulfonyl-p-aminobenzoate.

*Example 9.—Ethyl N-(3-benzoxy-2-hydroxypropyl)-p-toluenesulfonyl-p-aminobenzoate*

A mixture of 1.88 grams of ethyl N-(2,3-epoxypropyl)-p-toluenesulfonyl-p-aminobenzoate and 0.61 gram of benzoic acid was heated at 120° C. and one drop of pyridine added to the agitated melt. Heating was continued for about two hours, the melt becoming so thick after about fifteen minutes that it could no longer be stirred. Upon cooling, the melt hardened to a glass-like solid. The reaction mixture was dissolved in 20 milliliters of n-butanol and the solution diluted with mixed hexanes until it became opalescent. The solution was allowed to stand at room temperature for three days and the crystals which separated were recovered by filtering, washing with a butanol-hexane mixture and drying in vacuo over sulfuric acid. There was thus obtained 1.56 grams of ethyl N-(3-benzoxy-2-hydroxypropyl)-p-toluenesulfonyl-p-aminobenzoate which after crystallizing twice from n-butanol melted at 133.5° to 135.5° C.

Anal. Calcd. for $C_{26}H_{27}O_7NS$: C, 62.76; H, 5.47. Found: C, 62.38; H, 5.28.

*Example 10.—Ethyl N-(3-formoxy-2-hydroxypropyl)-p-toluenesulfonyl-p-aminobenzoate*

A mixture consisting of 11.1 grams of ethyl N-(2,3-epoxypropyl)-p-toluenesulfonyl-p-aminobenzoate, 1.57 grams of formic acid and three drops of pyridine was heated at about 100° C. with stirring for two hours. The reaction mixture which contained N-(3-formoxy-2-hydroxypropyl)-p-toluenesulfonyl-p-aminobenzoate was oxidized without isolation of the ester directly to the corresponding 2-keto-propyl compound.

*Example 11.—N-(3-methoxy-2-hydroxypropyl)-p-toluenesulfonyl-p-aminobenzoic acid*

A mixture of 1.1 grams of ethyl N-(2,3-epoxypropyl)-p-toluenesulfonyl-p-aminobenzoate, 12 milliliters of methanol and 0.34 gram of sodium methoxide was allowed to stand at room temperature for 3 hours and then refluxed for 1 hour. The mixture was then cooled, diluted with water and extracted with 10 milliliters of ether. Acidification of the extracted aqueous solution with hydrochloric acid gave a precipitate which, after filtering and drying, consisted of 0.94 gram of ethyl N-(3-methoxy-2-hydroxypropyl)-p-toluenesulfonyl-p-aminobenzoic acid melting at 152° to 158° C. After recrystallization from methanol, the product melted at 157° to 159° C. It had a neutral equivalent of 360 as compared with the calculated value of 379.

*Example 12.—Diethyl N'-(N-(3-phenoxy-2-hydroxypropyl)-p-toluenesulfonyl-p-aminobenzoyl)-l-glutamate*

A mixture of 14.3 grams of diethyl N'-(p-toluenesulfonyl-p-aminobenzoyl)-l-glutamate, 4.5 grams of 1,2-epoxy-3-phenoxypropane and 3 drops of pyridine was heated at 140° C. for 30 minutes and then cooled. The viscous mass was dissolved in benzene and the solution washed with dilute mineral acid and then with water and dried over sodium sulfate. Volatilization of the benzene in vacuo gave 19.7 grams of diethyl N'-(N-(3-phenoxy-2-hydroxypropyl)-p-toluenesulfonyl-p-aminobenzoyl)-l-glutamate as a viscous, yellow oil.

*Example 13.—Diethyl N'-(N-(3-chloro-2-ketopropyl)-p-toluenesulfonyl-p-aminobenzoyl)-glutamate*

The oily diethyl N'-(N-(3-chloro-2-hydroxypropyl)-p-toluenesulfonyl-p-aminobenzoyl)-glutamate prepared from 2.85 grams of diethyl N'-(p-toluenesulfonyl-p-aminobenzoyl)-glutamate and an excess of epichlorohydrin was dissolved in 10 milliliters of glacial acetic acid. A mixture of 0.8 gram of chromic anhydride, 18 milliliters of glacial acetic acid and 1 milliliter of water was added slowly with stirring and cooling. The mixture was allowed to stand at room temperature for twelve hours and the acetic acid then volatilized under reduced pressure. The residue was taken up in a mixture of water and ether and the layers separated. The ether layer was washed with water until the washings were no longer green and then treated with charcoal and dried over anhydrous magnesium sulfate. Upon distillation of the ether, there remained diethyl N'-(N-(3 - chloro - 2 - ketopropyl)-p-toluenesulfonyl-p-aminobenzoyl)-glutamate as a pale yellow viscous oil.

*Example 14.—Ethyl N-(3-chloro-2-ketopropyl)-p-toluenesulfonyl-p-aminobenzoate*

The crude oily ethyl N-(3-chloro-2-hydroxypropyl)-p-toluenesulfonyl-p-aminobenzoate prepared from 30 grams of ethyl p-toluenesulfonyl-p-aminobenzoate and an excess of epichlorohydrin was dissolved in 150 milliliters of acetic acid and a mixture of 12 grams of sodium dichromate, 10 milliliters of sulfuric acid, 45 milliliters of water and 60 milliliters of acetic acid was added over a period of three hours while maintaining the mixture at 5° C. After stirring for an additional three hours, the oxidation mixture was diluted with water and extracted with ether. The ethereal extract was washed with sodium bicarbonate and the ether distilled. The residue of ethyl N-(3 - chloro-2-ketopropyl)-p - toluenesulfonyl-p-aminobenzoate crystallized from dilute ethanol on prolonged standing. The crystallized product weighed 5.5 grams and after two crystallizations from dilute ethanol, melted at 106° to 113° C.

Anal. Calcd. for $C_{19}H_{20}O_5NSCl$: C, 55.7; H, 4.9; Cl, 8.7. Found: C, 56.0; H, 4.9; Cl, 6.1.

*Example 15.—Diethyl N'-(N-(3-formoxy-2-ketopropyl)-p-toluenesulfonyl - p - aminobenzoyl)-glutamate*

A mixture of 8.8 grams of diethyl N'-(N-(3-formoxy - hydroxypropyl)-p - toluenesulfonyl-p-aminobenzoyl)-glutamate, 50 milliliters of acetic acid and 2.1 grams of chromic anhydride was heated for two hours at 24° to 30° C. The reaction mixture was then diluted with 500 milliliters of water and extracted twice with benzene. The combined benzene extracts were washed three times with water and then dried over anhydrous magnesium sulfate. The mixture was filtered to remove magnesium sulfate and the benzene distilled in vacuo. There was thus obtained 6.8 grams of a light yellow oily residue of diethyl N'-(N-(3-formoxy-2 - ketopropyl)-p-toluenesulfonyl-p-aminobenzoyl)-glutamate.

*Example 16.—Ethyl N-(3-formoxy - 2 - ketopropyl)-p-toluenesulfonyl-p-aminobenzoate*

A mixture of 4.4 grams of chromic anhydride, 200 milliliters of acetic acid and the ethyl N-(3-formoxy-2-hydroxypropyl)- p-toluenesulfonyl-p-aminobenzoate prepared from formic acid and 11.1 grams of ethyl N-(2,3-epoxypropyl)-p-toluenesulfonyl-p-aminobenzoate was stirred for one hour during which time the temperature rose to 30° C. The acetic acid was then distilled in vacuo and the residue triturated with ether. The mixture was centrifuged and the precipitate washed twice with ether. The combined ethereal solutions and washings were washed successively with water, sodium bicarbonate solution and water and then dried with anhydrous magnesium sulfate. Evaporation of the ether left a residue of 7.91 grams of ethyl N-(3-formoxy-2-ketopropyl)-p-toluenesulfonyl-p-aminobenzoate as an oil having an index of refraction $N_D^{50}=1.546$.

*Example 17.—Diethyl N'-(N-(3 - acetoxy-2-ketopropyl)-p-toluenesulfonyl - p - aminobenzoyl)-glutamate*

A mixture was prepared consisting of 8.85 grams of diethyl N'-(N-(3-acetoxy-2-hydroxypropyl)-p-toluenesulfonyl - p - aminobenzoyl) - glutamate have an index of refraction $N_D^{45}=1.5396$, 50 milliliters of glacial acetic acid and 10 milliliters of propionic acid. The mixture was cooled to 0° C. and a solution of 1.65 grams of chromic anhydride in a mixture of 1.5 milliliters of water and 30 milliliters of glacial acetic acid was added slowly with stirring. The mixture was allowed to stand at about 50 C. for twelve hours and the solvent then distilled under reduced pressure. The residue was treated with a mixture of water and ether and the layers separated. The ether layer was washed twice with saturated sodium chloride solution then with saturated sodium bicarbonate solution and again with saturated sodium chloride solution. The washed ethereal solution was then dried with anhydrous magnesium sulfate and the ether distilled. There was thus obtained 6.1 grams of yellowish oily diethyl N'-(N-(3-acetoxy - 2 - ketopropyl)-p - toluenesulfonyl-p-aminobenzoyl)-glutamate.

*Example 18.—N-(3-methoxy - 2 - ketopropyl)-p-toluenesulfonyl-p-aminobenzoic acid*

A solution of 0.33 gram of chromic anhydride in 0.5 milliliter of water and 3 milliliters of acetic acid was added to a solution of 0.95 gram of N-(3-methoxy-2-hydroxypropyl)-p-toluenesulfonyl-p-aminobenzoic acid in 15 milliliters of acetic acid. The mixture was allowed to stand overnight at room temperature and the acetic acid then distilled in vacuo. There was thus obtained a green syrup from which N-(3-methoxy-2-ketopropyl)-p-toluenesulfonyl-p-aminobenzoic acid was isolated.

*Example 19.—Diethyl N'-(N-(3-phenoxy-2-ketopropyl)-p-aminobenzoyl)-l-glutamate*

A solution of 6.2 grams of chromic oxide in 25 milliliters of water was added over a period of ten minutes and at a temperature of about 3° C. to a solution of diethyl N'-(N-(3 - phenoxy - 2-hydroxypropyl)-p-aminobenzoyl)-l-glutamate in a mixture of 215 milliliters of acetic acid and 60 milliliters of propionic acid. The mixture was allowed to stand at about 3° C. for twenty hours, and then poured into water and the aqueous mixture extracted with benzene. The layers were separated and the benzene layer was washed several times with water and dried over anhydrous sodium sulfate. Benzene was distilled from the dried solution in vacuo after which there remained 17.5 grams of diethyl N'-(N-(3-phenoxy-2-ketopropyl)-p-aminobenzoyl)-l-glutamate as a brown resinous oil having an index of refraction $N_D^{45}=1.545$.

*Example 20.—Diethyl N'-(N-3-methoxy-2-ketopropyl)-p-toluenesulfonyl-p - aminobenzoyl)-glutamate*

A solution of 0.536 gram of chromic oxide in about 5 milliliters of water was added slowly at 20° C. and with stirring to a solution of 2 grams of diethyl N'-(N-(3-methoxy-2-hydroxypropyl)-p-toluenesulfonyl-p - aminobenzoyl)-l-glutamate in 19 milliliters of glacial acetic acid. The mixture was allowed to stand for three and one-half hours and was then poured into water and extracted with benzene. The benzene layer was washed thoroughly with water and the benzene vaporized in vacuo. There was thus obtained a residue consisting of 1.3 grams of diethyl N'-(N-(3-methoxy-2-ketopropyl)-p-toluenesulfonyl-p-aminobenzoyl-l-glutamate having an index of refraction $N_D^{26}=1.5440$ and melting at 82° to 84° C.

*Example 21.—Diethyl N'-(N-(3-methoxy-2-ketopropyl)-p-toluenesulfonyl - p-aminobenzoyl)-l-glutamate*

A mixture was prepared consisting of 70 milliliters of acetic acid, 20 milliliters of propionic acid and 4.95 grams of diethyl N'-(N-(3-methoxy-2-hydroxypropyl)-p-toluenesulfonyl - p - aminobenzoyl)-l-glutamate. The mixture was cooled to 30° C. and a solution of 1.17 grams of chromic anhydride in 10 milliliters of water was added. The mixture was allowed to stand at about 3° C. for seventeen hours then poured into a mixture of 200 milliliters of water and 100 milliliters of benzene. After thorough agitation, the benzene layer was separated and washed with dilute aqueous sodium bicarbonate. Evaporation of the benzene from the washed benzene layer left a residue consisting of 4.1 grams of syrupy diethyl N'-(N-(3-methoxy-2-ketopropyl)-p - toluenesulfonyl-p-aminobenzoyl)-l-glutamate. Recrystallization of the syrup from dilute ethanol gave a crystalline product melting at 82° to 84° C.

*Example 22.—Ethyl N-(3-hydroxy - 2 - ketopropyl)-p-toluenesulfonyl-p-aminobenzoate*

One gram of ethyl N-(3-chloro-2-ketopropyl)-p-toluenesulfonyl-p-aminobenzoate was dissolved in 20 milliliters of acetone and the solution diluted with 10 milliliters of water. One-half gram of barium carbonate was then added and the mixture stirred overnight at room temperature and then refluxed for two hours. The mixture was then filtered, partially concentrated, refiltered and then concentrated. The thick liquid was dissolved in ether, washed with water and again concentrated to a viscous liquid. The ethyl N-(3-hydroxy - 2 - ketopropyl)-p - toluenesulfonyl-p-aminobenzoate thus obtained weighed 0.27 gram.

*Example 23.—N-(3-hydroxy - 2 - ketopropyl)-p-toluenesulfonyl-p-aminobenzoic acid*

Eleven milliliters of 0.1 normal sodium hydroxide solution was added at room temperature over a period of one hour to an agitated solution of 0.2 gram of N-(3 - chloro-2-ketopropyl)-p-toluenesulfonyl-p-aminobenzoic acid in 10 milliliters of acetone and 8 milliliters of water. The rate of addition was adjusted so that the pH of the solution was at all times less than 8.5. Acetone was then distilled in vacuo from the mixture and the residue extracted with ether. Upon drying the ethereal solution and volatilizing the ether, there was obtained a non-crystalline residue of N-(3 - hydroxy-2-ketopropyl)-p-toluenesulfonyl-p-aminobenzoic acid which was used in a subsequent reaction without further purification.

In similar manner, N'-(N-(3-chloro-2-ketopropyl)-p - toluenesulfonyl - p - aminobenzoyl)-glutamic acid is hydrolyzed to N'-(N-(3-hydroxy-2-ketopropyl)-p-toluenesulfonyl - p - aminobenzoyl)-glutamic acid.

*Example 24.—Diethyl N' - (N - ((2-amino-4-hydroxy - 6 - pteridyl)methyl)-p-toluenesulfonyl-p-aminobenzoyl)-l-glutamate*

Four hundred milligrams of diethyl N'-(N-(3-chloro - 2 - ketopropyl) - p - toluenesulfonyl - p - aminobenzoyl)-l-glutamate was added to a mixture of 100 milligrams of 2,4,5-triamino-6-hydroxypyrimidine, 120 milligrams of sodium acetate, 50 milligrams of potassium iodide and 15 milliliters of glacial acetic acid. The mixture was allowed to stand at room temperature for about one hour and then heated for 25 minutes on the steam bath. After standing overnight open to the air, the acetic acid was distilled at 50° C. under reduced pressure. The residue, after washing free of inorganic salts, contained a large proportion of diethyl N'-(N-((2-amino-4-hydroxy-6 - pteridyl)methyl)-p-toluenesulfonyl-p-aminobenzoyl)-l-glutamate.

*Example 25.—Ethyl N-((2-amino-4-hydroxy-6-pteridyl)methyl) - p-toluenesulfonyl-p-aminobenzoate*

A mixture consisting of 100 milligrams of 2,4,5-triamino - 6 - hydroxypyrimidine, 5 milliliters of propylene glycol and 352 milligrams of ethyl N-(3 - benzoxy-2-ketopropyl)-p-toluenesulfonyl-p-aminobenzoate was heated for about ten minutes to about 130° C. and stirred at 130° C. for an additional 15 minutes. The color changed from light brown through bright purple to dark brown. The solution was allowed to stand overnight at room temperature exposed to the air and then diluted with three times its volume of ether. The mixture was centrifuged and the residue washed once with ether and dried. The ethyl N-((2-amino - 4 - hydroxy - 6-pteridyl)methyl)-p-toluenesulfonyl-p-aminobenzoate thus obtained was shaken with a mixture of hydrogen bromide and phenol in acetic acid to remove the p-toluenesulfonyl group and the resulting ethyl ester then saponified using 7 milliliters of normal sodium hydroxide solution and 5 milliliters of ethanol. The pH was then adjusted to 3.5 with acetic acid and the mixture centrifuged and the solid washed three times with water and twice with alcohol. There was thus obtained 70 milligrams of N-((2-amino - 4-hydroxy-6-pteridyl)methyl)-p-aminobenzoic acid which was biologically active.

*Example 26.—N - ((2 - amino-4-hydroxy-6-pteridyl)methyl) - p - toluenesulfonyl - p - aminobenzoic acid*

Sixty-six milligrams of sodium acetate and 56.5 milligrams of 2,4,5-triamino-6-hydroxypyrimidine were added to a solution of N-(3-hydroxy-2-ketopropyl) - p - toluenesulfonyl-p-aminobenzoic acid in 9 milliliters of glacial acetic acid. The solution was allowed to stand at room temperature for one hour and was then heated for twenty minutes on a steam bath. After standing at room temperature exposed to the air overnight, the acetic acid was distilled under reduced pressure at about 50° C. leaving a residue of N-((2-amino - 4 - hydroxy - 6-pteridyl)methyl)-p-toluenesulfonyl-p-aminobenzoic acid.

*Example 27.—Diethyl N' - (N - ((2 - amino-4-hydroxy -6 -pteridyl)methyl)-p-toluenesulfonyl-p-aminobenzoyl)-glutamate*

A mixture of 0.49 gram of diethyl N'-(N-(3-formoxy - 2 - ketopropyl) - p-toluenesulfonyl-p-aminobenzoyl)-glutamate, 0.15 gram of 2,4,5-triamino-6-hydroxypyrimidine dihydrochloride, 0.13 gram of sodium acetate and 3 milliliters of glacial acetic acid was prepared and allowed to stand for one hour at room temperature. The solvent was then removed under reduced pressure leaving a syrup containing diethyl N'-(N-((2-amino-4 - hydroxy - 6 - pteridyl)methyl)-p-toluenesulfonyl - p - aminobenzoyl)-glutamate. The syrup was treated with 3.5 milliliters of a 30 per cent solution of hydrogen bromide in acetic acid and with 0.13 gram of phenol. After one and one-half hours, the mixture was diluted with ether whereupon there was formed a precipitate consisting of diethyl N'-(N-((2-amino-4-hydroxy-6-pteridyl)methyl)-p-aminobenzoyl)-glutamate dihydrobromide. This ester was saponified with dilute sodium hydroxide and there was recovered a 34 per cent yield of N'-(N-((2-amino-4-hydroxy-6-pteridyl)methyl)-p-aminobenzoyl)-glutamic acid.

*Example 28.—Ethyl N-((2-amino-4-hydroxy-6-pteridyl)methyl)-p-toluenesulfonyl-p-aminobenzoate*

A mixture of 10 milliliters of acetic acid, 0.15 gram of sodium acetate and 0.15 gram of 2,4,5-triamino-6-hydroxypyrimidine dihydrochloride was prepared and cooled to room temperature. A solution of 0.36 gram of ethyl N-(3-formoxy-2-ketopropyl)-p-toluenesulfonyl-p-aminobenzoate in 5 milliliters of acetic acid was then added and the mixture allowed to stand at room temperature for one-half hour and then heated at 100° C. for fifteen minutes. The solvent was distilled in vacuo leaving ethyl N-(2-amino-4-hydroxy-6-pteridyl)methyl-p-toluenesulfonyl-p-aminobenzoate as a solid residue.

The solid residue was mixed with 3.5 milliliters of a 26 per cent solution of hydrogen bromide and acetic acid containing an excess of phenol and the mixture allowed to stand for one and one-half hours. The mixture was then diluted with anhydrous ether whereupon crystals of ethyl N-((2-amino-4-hydroxy-6-pteridyl)-methyl)-p-aminobenzoate hydrobromide separated in solid form.

The solid was collected, mixed with an excess of dilute sodium hydroxide solution and the mixture allowed to stand for sixteen hours at room temperature. The pH was then adjusted to 3.0 and the mixture filtered. The residue consisted of N-((2-amino-4-hydroxy-6-pteridyl)methyl-p-aminobenzoic acid having a high degree of biological activity.

*Example 29.—Ethyl N-((2-amino-4-hydroxy-6-pteridyl)methyl) - p - toluenesulfonyl - p - aminobenzoate*

A mixture consisting of 0.1 gram of 2,4,5-triamino-6-hydroxypyrimidine, 0.34 gram of ethyl N-(3-acetoxy-2-ketopropyl)-p-toluene-sulfonyl-p-aminobenzoate, 10 milliliters of acetic acid and a trace of ammonium chloride was heated under nitrogen at 100° C. for fifteen minutes and the acetic acid then distilled in vacuo. The residue consisted of ethyl N-((2-amino-4-hydroxy-6-pteridlyl)methyl)-p-toluenesulfonyl-p-aminobenzoate.

*Example 30.—Ethyl N-((2-amino-4-hydroxy-6-pteridyl)methyl) - p - toluenesulfonyl - p - aminobenzoate*

A mixture of 0.27 grams of ethyl N-(3-hydroxy-2-ketopropyl)-p-toluenesulfonyl-p-aminobenzoate was dissolved in a small amount of acetic acid and 0.085 gram of 2,4,5-triamino-6-hydroxypyrimidine added. The mixture was allowed to stand for several hours to complete the formation of ethyl N-((2-amino-4-hydroxy-6-pteridyl)methyl) - p - toluenesulfonyl - p-aminobenzoate. The mixture was then treated with hydrogen bromide dissolved in acetic acid and a small amount of phenol. Upon standing for several hours and then hydrolyzing the ester with dilute sodium hydroxide, there was isolated a product containing 13 per cent of pteroic acid.

*Example 31.—N' - (N - ((2 - amino - 4 - hydroxy - 6 - pteridyl)methyl) - p - toluenesulfonyl - p - aminobenzoyl) - glutamic acid*

A mixture of 150 milligrams of 2,4,5-triamino-6-hydroxypyrimidine dihydrochloride, 115 milligrams of sodium acetate, 500 milligrams of diethyl N'-(N-(3-hydroxy-2-ketopropyl)-p-toluene sulfonyl-p-aminobenzoyl)-glutamate and 15 milliliters of glacial acetic acid was heated under nitrogen at 100° C. for about fifteen minutes and the acetic acid then distilled in vacuo. The mixture was worked up as described in Example 28 and there was thus obtained 75 milligrams of N'-(N - ((2 - amino - 4 - hydroxy - 6 - pteridyl)methyl)-p-aminobenzoyl)-glutamic acid.

*Example 32.—Ethyl N-((2-amino-4-hydroxy-6-pteridyl)methyl) - p - toluenesulfonyl - p - aminobenzoate*

A suspension of 150 milligrams of 2,4,5-triamino-6-hydroxypyrimidine in 10 milliliters of glacial acetic acid was mixed with a solution of 450 milligrams of ethyl N-(3-methoxy-2-ketopropyl)-p-toluenesulfonyl-p-aminobenzoate in 5 milliliters of glacial acetic acid. The mixture was saturated with nitrogen and 115 milligrams of anhydrous sodium acetate added. The mixture was stirred for 1 hour at room temperature under a nitrogen atmosphere and then refluxed for fifteen minutes. Acetic acid was then distilled from the mixture in vacuo. There was thus obtained a residue consisting principally of ethyl N - ((2 - amino- 4 - hydroxy - 6 - pteridyl)-methyl)-p-toluenesulfonyl-p-aminobenzoate.

*Example 33.—Diethyl N'-(N-((2-amino-4-hydroxy - 6 - pteridyl)methyl) - p - toluenesulfonyl - p - aminobenzoyl) - l - glutamate*

Forty-five milligrams of diethyl N'-(N-(3-methoxy - 2 - ketopropyl) - p - toluenesulfonyl - p-aminobenzoyl)-l-glutamate and 150 milligrams of 2,4,5-triamino-6-hydroxypyrimidine dihydrochloride were added to 115 milligrams of sodium acetate in 15 milliliters of glacial acetic acid. The mixture was stirred under an atmosphere of nitrogen for 40 minutes at room temperature and finally for 20 minutes at 95° C. The mixture was then poured into water and filtered. A residue was obtained contisting of a high yield of diethyl N' - (N - ((2 - amino - 4 - hydroxy - 6 - pteridyl)-methyl) - p - toluenesulfonyl - p - aminobenzoyl)-l-glutamate.

*Example 34.—Diethyl N'-(N-((2-amino-4-hydroxy - 6 - pteridyl)methyl) - p - toluenesulfonyl-p-aminobenzoyl)-glutamate*

A mixture of 160 milligrams of diethyl N'-(N-(3 - phenoxy - 2 - ketopropyl - p - toluenesulfonyl-p-aminobenzoyl)-glutamate, 47 milligrams of 2,4,5-triamino-6-hydroxypyrimidine, 36 milligrams of sodium acetate and 5 milliliters of acetic acid was allowed to stand for 45 minutes at room temperature and then heated on the steam bath for 15 minutes. The acetic acid was then distilled in vacuo leaving a residue of diethyl N'-(N - ((2 - amino - 4 -hydroxy - 6 - pteridyl)-methyl) - p - toluenesulfonyl - p- aminobenzoyl) - glutamate.

The residue was treated without purification with hydrogen bromide and phenol in glacial acetic acid to remove the p-toluenesulfonyl radical and the resulting product then saponified with dilute alkali. The free N'-(N((2-amino-4-hydroxy-6-pteridyl)methyl) - p-aminobenzoyl)-glutamic acid thus obtained was reprecipitated from its alkaline solution with acid and then washed thoroughly with water and acetone. There was thus obtained a yield of 24.8 per cent based upon the keto compound used of product having an activity against *S. fecalis* R. equal to 21 percent of that of pure folic acid.

*Example 35.—Diethyl N'-(N-((2-amino - 4-hydroxy-6-pteridyl) methyl) -p-toluenesulfonyl-p-aminobenzoyl) -glutamate*

The pH of a mixture of 150 milligrams of 2,4,5-triamino-6-hydroxypyrimidine, 270 milligrams of sodium acetate, 450 milligrams of diethyl N'-(N-(3-hydroxy-2-ketopropyl) - p-toluenesulfonyl-p-aminobenzyl)-glutamate, 5 milliliters of water, 10 milliliters of ethanol and 5 milliliters of glacial acetic acid was adjusted carefully to 4.1 by the addition of a few drops of acetic acid. The mixture was stirred at room temperature for about one hour and the water, ethanol and acetic acid then distilled in vacuo. The residue consisted of diethyl N'-(N-((2-amino-4-hydroxy-6-pteridyl) - methyl)-p-toluenesulfonyl - p - aminobenzoyl) - glutamate contaminated with inorganic salts.

*Example 36.—N'-(N-((2 - amino - 4-hydroxy-6-pteridyl) methyl) -p-toluenesulfonyl-p - aminobenzyl) -l-glutamic acid*

A solution of 380 milligrams of diethyl N'-(N-(3-hydroxy-2-ketopropyl)-p-toluenesulfonyl - p-aminobenzoyl)-l-glutamate and 15 milliliters of acetic acid was added to a mixture of 150 milligrams of 2,4,5-triamino-6-hydroxypyrimidine dihydrochloride and 115 milligrams of sodium acetate. The mixture was stirred at room temperature under an atmosphere of nitrogen for one hour and the acetic acid then distilled in vacuo. The residue was stirred with 10 milliliters of acetone and the mixture made alkaline with 10 per cent aqueous sodium hydroxide. The acetone was then distilled in vacuo and the alkaline solution warmed at 40° C. for two hours. The pH of the mixture was then adjusted to 3.0 with mineral acid and the precipitate which formed was collected by centrifuging and washed with 5 milliliters of water and 3 times with acetone. The washed precipitate was dried in vacuo and there was thus obtained 70 milligrams of N'-(N-((2-amino-4-hydroxy-6-pteridyl) methyl) - p - toluenesulfonyl-p-aminobenzyl)-l-glutamic acid as a water-insoluble amorphous powder.

We claim:

1. The method which includes: reacting 2,4,5-triamino-6-hydroxypyrimidine with an N-(2-ketopropyl)-p-aminobenzoate compound having the formula

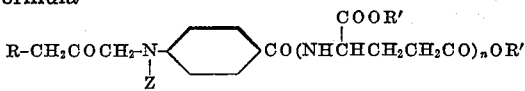

wherein R' is from the group consisting of hydrogen and the alkyl radicals, n is from the group consisting of zero and the positive integer 1, Z is from the group consisting of hydrogen and the arylsulfonyl radicals and R is from the group consisting of chlorine, bromine, and iodine and the hydroxy, alkoxy, aryloxy, aralkoxy and acyloxy radicals to form an N'-(N-((2-amino-4-hydroxy-6-pteridyl) methyl)-p-aminobenzoate compound having the formula

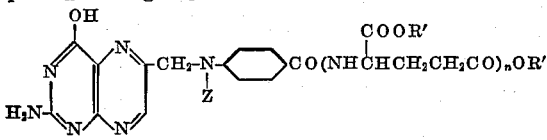

wherein R', n and Z have the values given.

2. The method of claim 1 wherein R' is an alkyl radical.

3. The method of claim 1 wherein n is the integer 1.

4. The method of claim 1 wherein Z is an arylsulfonyl radical.

5. The method of claim 1 wherein the reaction is carried out in a liquid reaction medium.

6. The method of claim 1 wherein the reaction as carried out in glacial acetic acid as a reaction medium.

7. The method of claim 1 wherein the reaction is carried out at ordinary room temperature.

8. The method which includes mixing 2,4,5-triamino-6-hydroxypyrimidine, glacial acetic acid and an N-(2-ketopropyl)-p-aminobenzoate compound having the formula

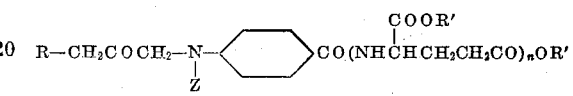

wherein R' is from the group consisting of hydrogen and the alkyl radicals, n is from the group consisting of zero and the integer, Z is from the group consisting of hydrogen and the arylsulfonyl radicals and R is from the group consisting of chlorine, bromine and iodine and the hydroxy, alkoxy, aryloxy, aralkoxy and acyloxy radicals; and subsequently separating from the reaction mixture an N'-(N-((2-amino-4-hydroxy-6-pteridyl) methyl)-p-aminobenzoate compound having the formula

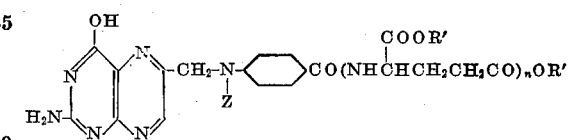

wherein R', n and Z have the values given.

9. A compound having the formula

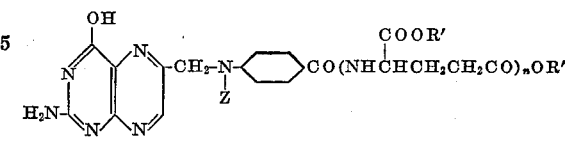

wherein R' is from the group consisting of hydrogen and the alkyl radicals, n is from the group consisting of zero and the positive integer, and Z is an arylsulfonyl radical.

10. Diethyl N'-(N-((2-amino - 4 - hydroxy-6-pteridyl) methyl) - p -toluenesulfonyl - p - aminobenzoyl) -glutamate.

11. Ethyl N-((2-amino-4-hydroxy-6-pteridyl)-methyl)-p-toluenesulfonyl-p-aminobenzoate.

12. N' - (N-((2-amino-4-hydroxy-6-pteridyl) - methyl)-p-toluenesulfonyl - p - aminobenzoyl)-l-glutamic acid.

DAVID I. WEISBLAT.
BARNEY J. MAGERLEIN.
ARTHUR R. HANZE.
STANLEY T. ROLFSON.

REFERENCES CITED

The following references are of record in the file of this patent:

Wolf et al.: J. Am. Chem. Soc., 69, 2753–2756 (1947).

Spies et al.: Blood 3, 122 (1948).

Lederle Bulletin, 13, (No. 3), 21 (1948).

Certificate of Correction

Patent No. 2,558,711                                                        June 26, 1951

DAVID I. WEISBLAT ET AL.

It is hereby certified that error appears in the printed specification of the above numbered patent requiring correction as follows:

Column 1, at the bottom of the page, for the left hand portion of the formula reading

column 3, line 2, for "N'-(N-(2-amino" read *N'-(N-((2-amino*; column 5, line 50, at the end of the formula, for "OR" read *OR'*; column 6, line 23, for "N-3-halo" read *N-(3-halo*; column 7, line 11, for "pyrodine" read *pyridine*; line 34, for "obtained at" read *obtained a*; column 12, line 14, for "50 C." read *5° C.*; line 62, for "N'-(N-3-methoxy" read *N'-(N-(3-methoxy*; column 15, line 25, for "N-(2-amino" read *N-((2-amino*; line 56, for "pteridlyl" read *pteridyl*; line 62, for "grams" read *gram*; column 16, line 49, for "contisting" read *consisting*; column 17, lines 14 and 48, for "aminobenzyl" read *aminobenzoyl*; lines 25 and 26, same column, for "aminobenzyl" read *aminobenzoyl*; column 18, line 10, for "as carried" read *is carried*; line 25, for "integer, Z" read *integer 1, Z*; lines 52 and 53, for "integer, and Z" read *integer 1, and Z*;

and that the said Letters Patent should be read as corrected above, so that the same may conform to the record of the case in the Patent Office.

Signed and sealed this 8th day of January, A. D. 1952.

[SEAL]

THOMAS F. MURPHY,
                                                                                    *Assistant Commissioner of Patents.*